(12) United States Patent  
Jitkoff et al.

(10) Patent No.: US 8,179,742 B1
(45) Date of Patent: May 15, 2012

(54) LISTENING WITH MULTIPLE COMPUTING DEVICES

(75) Inventors: John Nicholas Jitkoff, Palo Alto, CA (US); Michael J. LeBeau, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/248,778

(22) Filed: Sep. 29, 2011

Related U.S. Application Data

(63) Continuation of application No. 12/851,633, filed on Aug. 6, 2010.

(51) Int. Cl.
*G01S 3/802* (2006.01)

(52) U.S. Cl. ........................................ 367/128
(58) Field of Classification Search .............. 367/128; 455/456.1, 414.1–414.3; 342/357.28
See application file for complete search history.

(56) References Cited

U.S. PATENT DOCUMENTS

| | | | |
|---|---|---|---|
| 7,010,290 B2 * | 3/2006 | Dent | 367/128 |
| 7,378,980 B2 | 5/2008 | McFarland | |
| 7,933,612 B2 | 4/2011 | Counts et al. | |
| 7,999,729 B2 | 8/2011 | Shaw et al. | |
| 2007/0167171 A1 | 7/2007 | Bishop | |
| 2008/0194226 A1 | 8/2008 | Rivas et al. | |
| 2009/0197612 A1 * | 8/2009 | Kiiskinen | 455/456.1 |
| 2010/0255878 A1 * | 10/2010 | Amron et al. | 455/557 |
| 2010/0271263 A1 | 10/2010 | Moshfeghi | |
| 2011/0117272 A1 | 5/2011 | Nielsen et al. | |

* cited by examiner

*Primary Examiner* — Daniel Pihulic
(74) *Attorney, Agent, or Firm* — Fish & Richardson P.C.

(57) ABSTRACT

A computer-implemented method is executable by a first computing device to perform functions including retrieving, from the first computing device, sound information for the first computing device; receiving sound information from one or more second computing devices located in an area within a communication range of first computing device; generating a characterization of the sound information from (i) the first computing device, and (ii) the one or more second computing devices; and determining, based on the characterization, an attribute of one or more third computing devices.

22 Claims, 6 Drawing Sheets

LISTENING WITH MULTIPLE COMPUTING DEVICES

CROSS-REFERENCE TO RELATED APPLICATIONS

This application is a continuation of U.S. patent application Ser. No. 12/851,633, filed Aug. 6, 2010, which is incorporated herein in its entirety.

TECHNICAL FIELD

This patent application relates generally to sharing information between multiple computing devices, such as mobile devices, to determine an attribute of at least one of the computing devices.

BACKGROUND

A Global Positioning System ("GPS") is a space-based global navigation satellite system that provides location information for a device where there is an unobstructed line of sight from the device to four or more GPS satellites. Through the use of GPS, a physical location of a device may be determined.

Radio-frequency identification ("RFID") provides another way of determining a physical location of a device. RFID is the use of an object (typically referred to as an RFID tag) applied to or incorporated into a device. Through the object, radio waves are used to track a physical location of the device.

SUMMARY

In one aspect of the present disclosure, a computer-implemented method that is executable by a first computing device to perform functions includes retrieving, from the first computing device, sound information for the first computing device; receiving sound information from one or more second computing devices located in an area within a communication range of first computing device; generating a characterization of the sound information from (i) the first computing device, and (ii) the one or more second computing devices; and determining, based on the characterization, an attribute of one or more third computing devices.

Implementations of the disclosure may include one or more of the following features. In some implementations, the computer-implemented method further includes sending, to one or more fourth computing devices, the characterization of the sound information. The computer-implemented method also includes combining the sound information retrieved for the first computing device with the sound information received from the one or more second computing devices. The attribute includes one or more of (i) an absolute position of the first computing device in the area, (ii) a relative position of the first computing device relative to at least one of the one or more second computing devices, and (iii) a determination of a fourth computing device, from a group of computing devices comprising the first computing device and the one or more second computing devices, that is configured to send communication data to the group of computing devices.

In other implementations, the computer-implemented method includes executing a triangulation algorithm to determine the attribute of the one or more third computing devices. The computer-implemented method also includes establishing a communication channel between the first computing device and the one or more second computing devices; and receiving through the communication channel the sound information from one or more second computing devices. In still other implementations, the computer-implemented method includes sending the one or more second computing devices information indicative of a geographic location of the first computing device.

In another aspect of the disclosure, one or more machine-readable media are configured to store instructions that are executable by one or more processing devices to perform functions including retrieving, from the first computing device, sound information for the first computing device; receiving sound information from one or more second computing devices located in an area within a communication range of first computing device; generating a characterization of the sound information from (i) the first computing device, and (ii) the one or more second computing devices; and determining, based on the characterization, an attribute of one or more third computing devices. Implementations of this aspect of the present disclosure can include one or more of the foregoing features.

In still another aspect of the disclosure, an electronic system for determining when an audio notification should be generated includes one or more processing devices; and one or more machine-readable media configured to store instructions that are executable by the one or more processing devices to perform functions including: retrieving, from the first computing device, sound information for the first computing device; receiving sound information from one or more second computing devices located in an area within a communication range of first computing device; generating a characterization of the sound information from (i) the first computing device, and (ii) the one or more second computing devices; and determining, based on the characterization, an attribute of one or more third computing devices. Implementations of this aspect of the present disclosure can include one or more of the foregoing features.

In yet another aspect of the disclosure, an electronic system includes one or more first computing devices; one or more second computing devices located in an area of the one or more first computing devices; a sound detection manager configured to: detect sound from the one or more first computing devices, and detect sound from the one or more second computing devices; a sound characterization manager configured to: combine the sound from the one or more first computing devices with the sound from the one or more second computing devices, and characterize the sound combined by the sound detection manager; and means for deriving an attribute of at least one of the one or more first computing devices, based on a characterization of the sound combined by the sound characterization manager. Implementations of this aspect of the present disclosure can include one or more of the foregoing features.

All or part of the foregoing may be implemented as a computer program product comprised of instructions that are stored on one or more non-transitory machine-readable storage media, and that are executable on one or more processing devices. All or part of the foregoing may be implemented as an apparatus, method, or system that may include one or more processing devices and memory to store executable instructions to implement the stated functions.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Described herein is a system in which multiple computing devices exchange sound information, including, e.g., noise information, ambient noise information, identifying information, geo-location information, and so forth. Based on the exchanged sound information, a computing device determines "attributes" of itself and/or of a computing device that is sending the sound information. Attributes may include geographic attributes (e.g., information indicative of a physical location of a computing device and/or information indicative of a geographic location of a computing device), electrical attributes (e.g., information indicative of electrical properties of a computing device), usage attributes (e.g., information indicative of usage data associated with a computing device), transmitting attributes (e.g., information indicative of an identity of a computing device that is "speaking," including, e.g., sending data), and so forth.

Figure 1:
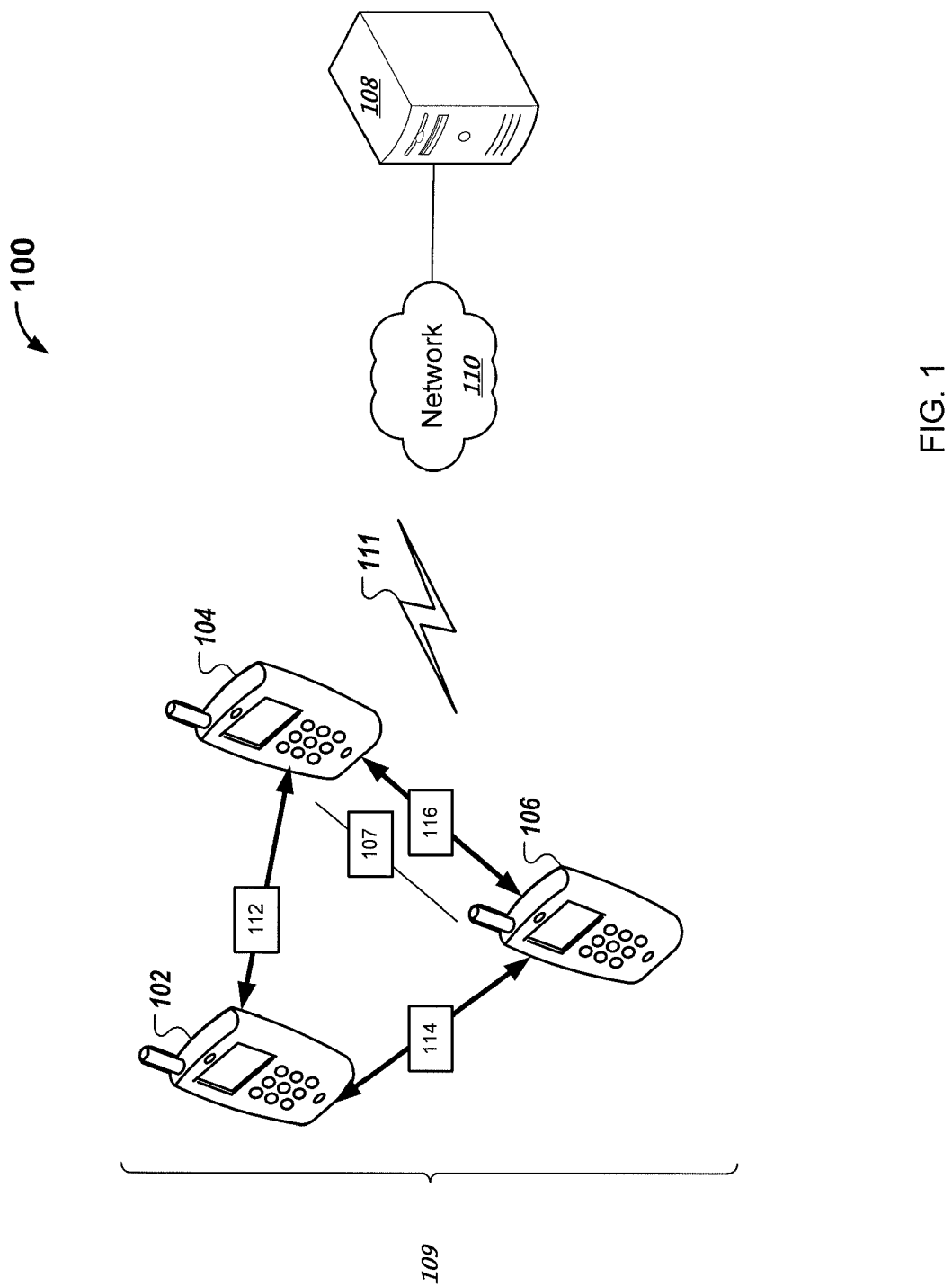
FIG. 1 is a conceptual diagram of a system for exchanging sound information between client devices.

FIG. 1 is a conceptual diagram of system 100 for exchanging sound information between client devices 102, 104, 106. Client devices 102, 104, 106 are connected to network 110 over "network connection" 111. Client devices 102, 104, 106 are also connected to each other through communication channels 112, 114, 116, including, e.g., a Bluetooth™ connection. Client devices 102, 104, 106 receive "network information" from network 110 over network connection 111. Client devices 102, 104, 106 exchange the received network information with each other over communication channels 112, 114, 116. Client devices 102, 104, 106 also broadcast sound information to each other over communication channels 112, 114, 116.

In an example, client device 102 "listens" (e.g., monitors a communication channel) for network information and sound information (collectively referred to herein as "sound information", without limitation, for purposes of convenience) on communication channels 112, 114. In this example, client device 102 acts as a "listening client device." Client device 102 receives sound information from "transmitting client devices" (e.g., client devices that send sound information), including, client devices 104,106.

In an example, client device 102 determines an attribute of client device 102 based on received sound information. In this example, client device 102 may send the received sound information to server 108 over network 110. Using the techniques described herein, server 108 determines an attribute of client device 102 based on the received sound information. In another example, client device 102 processes the received sound information to determine an attribute of client device 102 using the techniques described herein. In yet another example, client device 102 processes the received sound information to determine an attribute of client device 104 and/or client device 106.

In the illustrative example of FIG. 1, client device 102 may determine a geographic attribute of client device 102 using a triangulation method, in which sides of triangle 109 are defined by geographic locations of client devices 102, 104, 106. In this example, the geographic locations of client devices 104, 106 are known to client device 102, based on geo-location information sent from client devices 104, 106 to client device 102. Client device 102 executes a triangulation algorithm, which uses fixed baseline 107 and the known geographic locations of client devices 104, 106, to determine a geographic location of client device 102, as described in further detail below.

Figure 2:
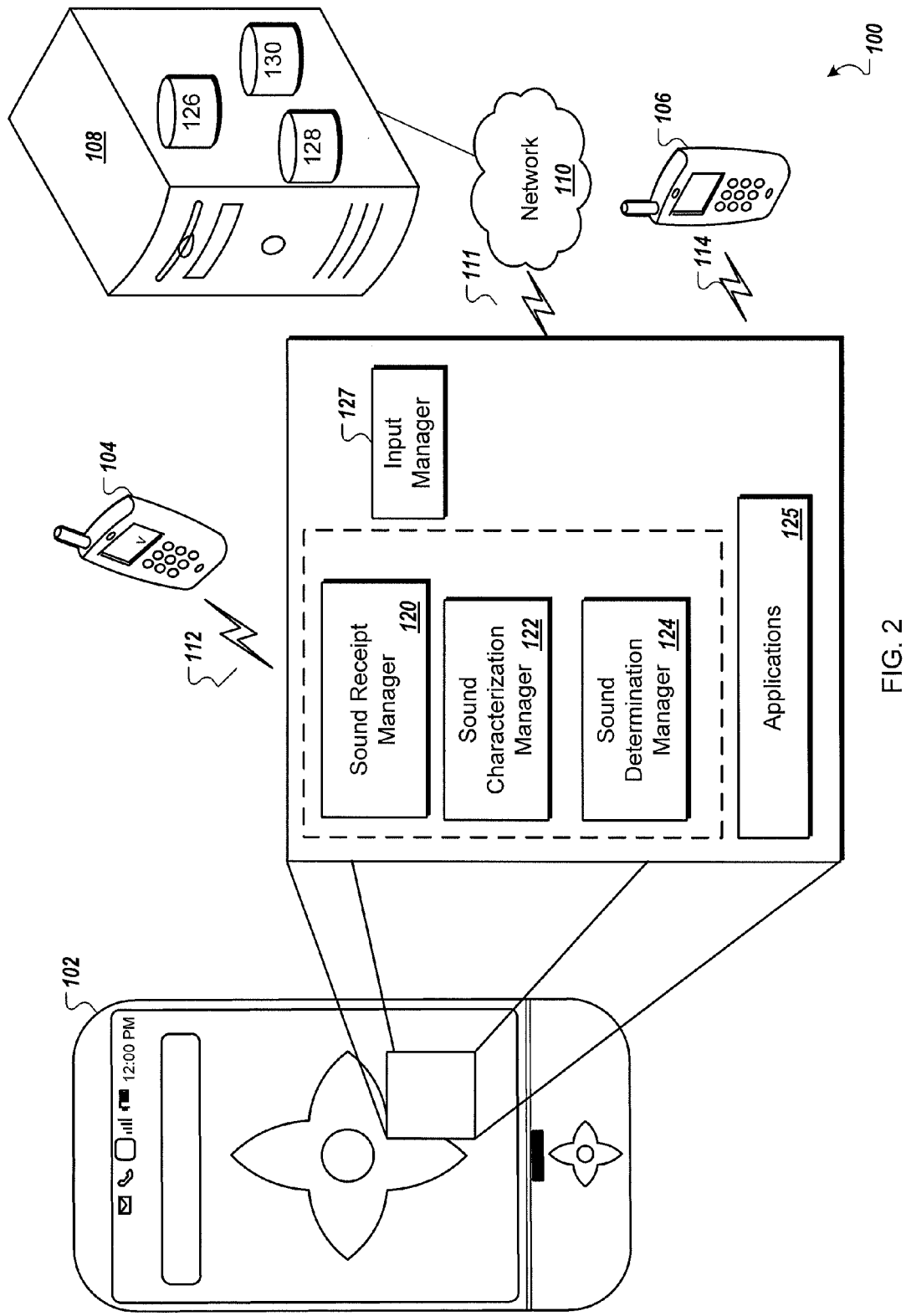
FIG. 2 is a block diagram of components of the system for exchanging sound information between the client devices.

FIG. 2 is a block diagram of components of system 100 for exchanging sound information between client devices 102, 104, 106. Client devices 102, 104, 106 can be any sort of computing devices capable of taking input from a user and communicating over network 110 with server 108 and/or with other client devices. For example, client devices 102, 104, 106 can be mobile devices, desktop computers, laptops, cell phones, personal digital assistants ("PDAs"), servers, embedded computing systems, and so forth.

Network 110 can be any of a variety of networks over which client devices 102, 104, 106 and server 108 can communicate. For example, network 146 may include a mobile network, a local area network ("LAN"), a wide area network ("WAN"), the Internet, an intranet, a wireless network, a point-to-point network, and so forth. Server 108 can be any of a variety of computing devices capable of receiving information, such as a server, a distributed computing system, a desktop computer, a laptop, a cell phone, a rack-mounted server, and so forth.

Client device 102 includes sound receipt manager 120, sound characterization manager 122, and sound determination manager 124. Sound receipt manager 120 is configured to receive sound information from client devices 104, 106, for example, by listening for sound information on communication channels 112, 114. Sound receipt manager 120 detects sound information on communication channels 112, 114, retrieves the sound information from communication channels 112, 114, and sends the retrieved sound information to sound characterization manager 122.

Sound characterization manager 122 is configured to generate a "characterization of sound information" for a transmitting client device, including, e.g., information indicative of attributes associated with a client device that sent the sound information. Sound characterization manager 122 generates a characterization of sound information by retrieving one or more "characterization rules" from data repository 126 on server 108. The characterization rules include instructions that determine attributes of transmitting client devices.

In an example, a "local characterization of sound information" is generated "locally" by client device 102, for example by sound characterization manager 122. In this example, client device 102 uses sound information received from client device 104 to generate a characterization of sound information for client device 104 (e.g., a geographic attribute of client device 104). Because client device 102 generates the characterization of sound information for client device 104 "locally" on client device 102, the characterization of sound information for client device 104 may be referred to as a local characterization of sound information for client device 104.

In another example, client device 102 may receive "external characterizations of sound information" from client devices 104, 106. The external characterizations of sound information may include characterizations of sound information generated by client devices 104, 106, which are "external" to client device 102. Client devices 104, 106 may send the external characterizations of sound information to client device 102. By using local and external characterizations of sound information, client device 102 utilizes sound information from numerous client devices in determining an attribute of client device 102, as described in further detail below. As used herein, the term "characterization of sound information" refers to local characterizations of sound information and/or external characterizations of sound information, without limitation, for purposes of convenience.

In an example, a characterization rule determines geographic attributes of a transmitting client device. The characterization rule may determine geographic attributes of the transmitting client device based on geo-location techniques, including, e.g., time-difference-of-arrival ("TDOA") techniques. Using TDOA techniques, a geographic location of the transmitting client device is determined based on an amount of time that has elapsed from when the transmitting client device sends sound information to when a listening client device receives the sound information.

Sound characterization manager 122 sends, to server 108, the characterization of sound information. Server 108 stores the characterization of sound information in data repository 128. In an example, the characterization of sound information sent by sound characterization manager 122 on client device 102 is retrieved from data repository 128 by client devices 104, 106 for use in characterizing additional sound information, including, e.g., sound information received by client devices 104, 106.

Sound characterization manager 122 may also send characterizations of sound information to client devices 104, 106. In an example, client device 104 may use the characterization of sound information received from client device 102 to further characterize sound information received from other client devices, for example, from client device 106.

Sound determination manager 124 is configured to determine an attribute of a listening client device (e.g., client device 102) based on the characterizations of sound information associated with transmitting client devices (e.g., based on local and external characterizations of sound information). For example, sound determination manager 124 may determine a geographic attribute associated with client device 102 based on characterizations of sound information for client devices 104, 106.

Sound determination manager 124 retrieves "determination rules" from data repository 130 on server 108. For example, a determination rule may include instructions to determine a geographic attribute of client device 102. In this example, the determination rule uses a triangulation method to determine a geographic location of client device 102. The triangulation method is a process of determining a location of a point (e.g., a location of a listening client device) by measuring angles to the point from locations of other known points (e.g., locations of transmitting client devices), which are located at either end of a fixed baseline. In this example, client devices 104, 106 are the "known points," which are located at either end of fixed baseline 107. Geographic locations of client devices 104, 106 may be determined by client device 102, because sound characterization manager 122 may determine geographic attributes of client devices 104, 106 using TDOA, as described above. The geographic attribute of client device 104 includes a geographic location of client device 104 ("geographic location 1"). The geographic attribute of client device 106 includes a geographic location of client device 106 ("geographic location 2").

In this example, the determination rule to determine a geographic attribute generates fixed baseline 107 (FIG. 1) between geographic location 1 and geographic location 2. Sound determination manager 124 measures angles from client device 102 to geographic location 1 and to geographic location 2. A geographic location of client device 102 is fixed as a third point in triangle 109 with one known side (e.g., fixed baseline 107) and two known angles. By executing a triangulation algorithm to determine a geographic location of the third point in triangle 109, sound determination manager 124 may determine a geographic attribute of client device 102.

Client device 102 also includes applications 125, which are running on client device 102. For example, applications 125 may include a gaming application, a driving directions application, a geo-location application, and so forth. Client device 102 also includes input manager 127, which may be configured to manage which applications 125 receive input information from an input mechanism (not shown) associated with client device 102. Input manager may also be configured to manage which applications 125 (e.g., a geo-location application) receive information indicative of attributes (e.g., geographic attributes) of a client device, for example, as determined by sound determination manager 124.

Figure 3:
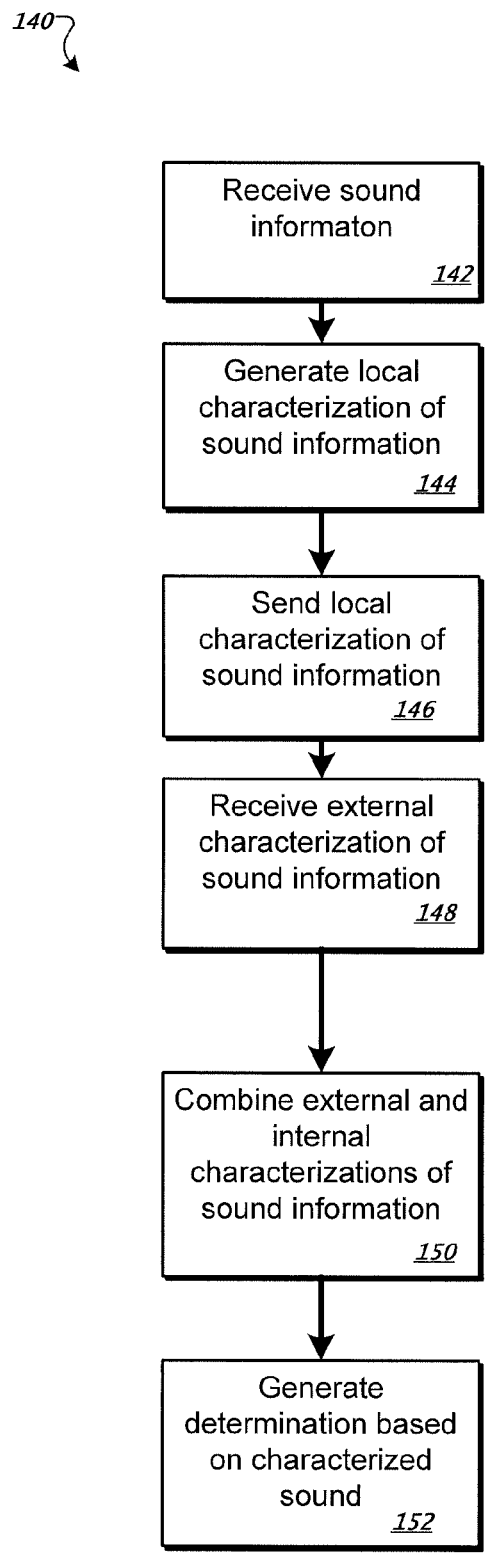
FIG. 3 is a flowchart of a process executed by a client device for determining an attribute of the client device in the system.

FIG. 3 is a flowchart of process 140 executed by client device 102 for determining an attribute of client device 102 in system 100. Client device 102 receives (142) sound information from transmitting client devices, for example, from client devices 104, 106. Client device 102 generates (144) a local characterization of sound information, for example, for client devices 104, 106. Client device 102 sends (146) the local characterization of sound information to the transmitting client devices, for example, client devices 104, 106. For example, client devices 104, 106 may use the local characterization of sound information sent from client device 102 in determining attributes of client devices 104, 106. Client device 102 receives (148) from client devices 104, 106 external characterizations of sound information. Client device 102 combines (150) the local characterization of sound information with the external characterizations of sound information to generate "combined characterization of sound information." Based on the combined characterization of sound information, client device 102 determines (152), for example through use of sound determination manager 124, an attribute of client device 102.

Figure 4:
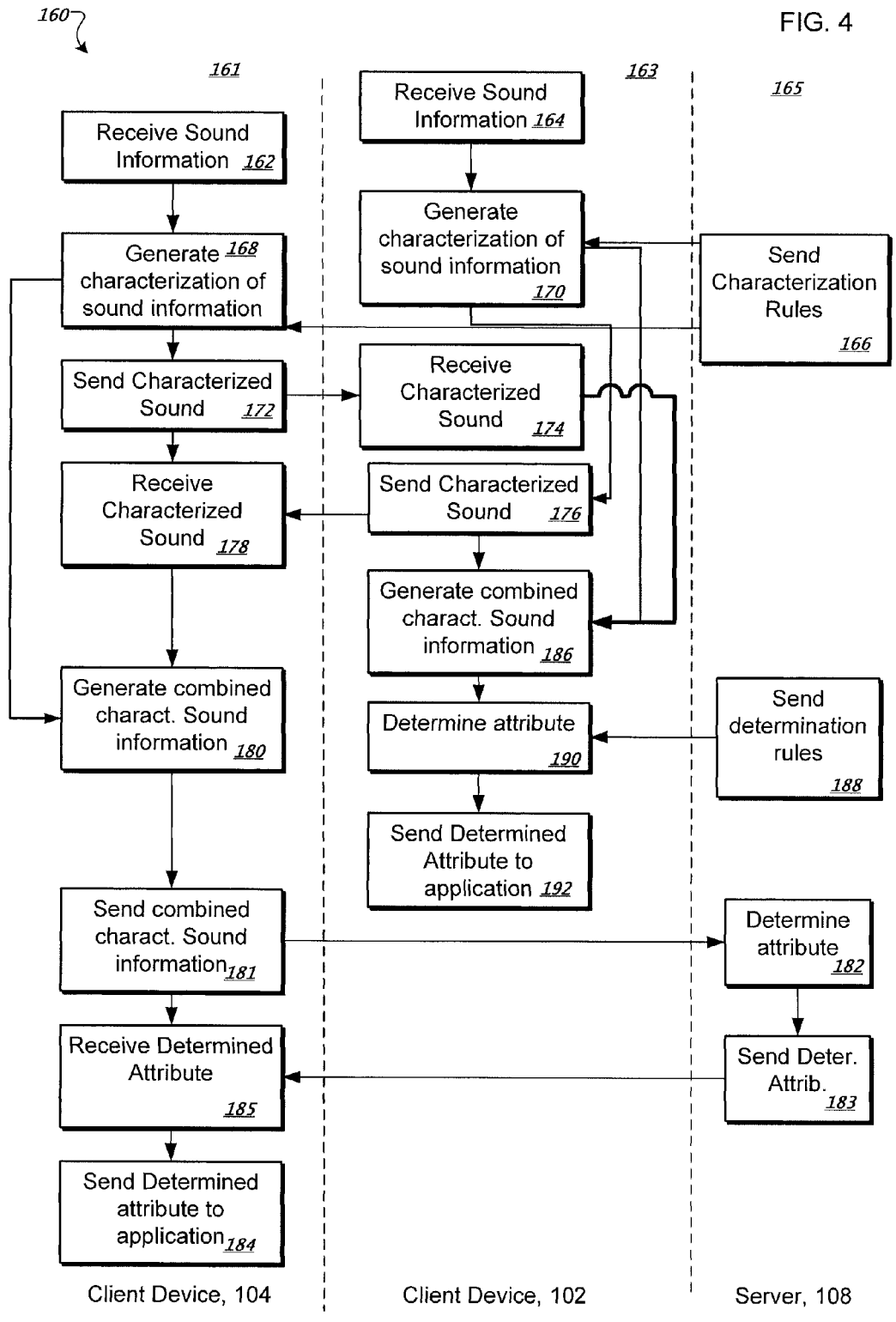
FIG. 4 is a swim lane diagram of a process by which multiple client devices listen to one another.

FIG. 4 is a swim lane diagram of process 160 by which multiple client devices listen to one another. In FIG. 4, process 160 is split into left part 161, which is performed on client device 104, center part 163, which is performed on client device 102, and right part 162, which is performed on server 108. Actions shown in FIG. 4 may be assigned differently. For example, in other implementations, actions performed by server 108 may be performed mobile devices 102, 104, and vice versa.

In the illustrative example of FIG. 4, attributes of client devices 102, 104 are determined both on a client device and on server 108. Specifically, client device 104 accesses a sound determination manager (not shown) running on server 108 to receive information indicative of an attribute of client device 104. Client device 102 executes its own sound determination manager 122 (FIG. 2) to determine information indicative of an attribute of client device 102.

In an example of using server 108 to determine an attribute, client device 104 receives (162) sound information, for example from client devices 102, 106. Server 108 sends (166) characterization rules to client device 104. Based on the received characterization rules, client device 104 generates (168) local characterization of sound information. Client device 104 sends (172) its local characterization of sound information to client device 102, for example, enabling client device 102 to combine the local characterization of sound information received from client device 104 (e.g., external characterization of sound information) with the local characterization of sound information for client device 102.

Client device 104 receives (178), from client device 102, the local characterization of sound information for client device 102 as external characterization of sound information for client device 102. Client device 104 generates (180) combined characterization of sound information for client device 104 by combining the local characterization of sound information for client device 104 with the external characterization of sound information for client device 102.

In the illustrative example of FIG. 4, client device 104 accesses a sound determination manager (not shown) on server 108 to determine an attribute of client device 104. Specifically, client device 104 sends (181) server 108 the combined characterization of sound information for client device 104. Server 108 retrieves determination rules from data repository 130 on server 108, executes the determination rules, and determines (182) an attribute of client device 104, for example, based on an application of the determination rules to the combined characterization of sound information for client device 104. Server 108 sends (183) client device 104 information indicative of the determined attribute of client device 104. Client device 104 receives (185) the information indicative of the determined attribute of client device 104 and sends (184) the information indicative of the determined attribute to appropriate applications (not shown) (e.g., online gaming applications), for example through execution of an input manager, running on client device 104.

In an example of determining an attribute on a client device, client device 102 receives (164) sound information, for example from client devices 104, 106. Server 108 sends (166) characterization rules to client device 102. Based on the received characterization rules, client device 102 generates (170) local characterization of sound information for client device 102. Client device 102 also receives (174), from client device 104, external characterization of sound information for client device 104. Client device 102 also sends (176) to client device 104 the local characterization of sound information for client device 102, which is received by client device 104, as described above.

In the illustrative example of FIG. 4, client device 102 accesses sound determination manager 122 (FIG. 2), which is running on client device 102 to determine an attribute of client device 102. Client device 102 generates (186) a combined characterization of sound information for client device 102 by combining the local characterization of sound information for client device 102 with the external characterization of sound information for client device 104. Server 108 sends (188) to client device 102 the determination rules. Client device 102 executes the determination rules, and determines (190) an attribute of client device 102, based on application of the determination rules to the combined characterization of sound information for client device 102. Client device 102 sends (192) the determined attribute of client device 102 to an appropriate application 125 (FIG. 1) running on client device 102, for example through execution of input manager 127.

In an example, a massively multiplayer online game ("MMO") employs the foregoing techniques to enable a user of the MMO to determine a geographic location of other users of the MMO. Referring back to FIG. 2, applications 125 may include a MMO application, which is running on client device 102. Client devices 104, 106 may also run MMO applications (not shown). MMO applications running on client devices 102, 104, 106 may be configured to interact with each other based on geographic locations of users associated with client devices 102, 104, 106. The MMO applications running on client devices 102, 104, 106 use the techniques described herein to determine geographic locations of users associated with client devices 102, 104, 106.

In this example, a user ("user 1") of a MMO application ("MMO1"), which may be running on client device 102, sends a request to MMO1 for a "relative" geographic location (e.g., a geographic location in relation to another geographic location) of a user ("user 2") of another MMO application ("MMO2"), which may be running on client device 104. Because user 1 has requested the relative geographic location of user 2, client device 102 determines a geographic location of client device 104, which is associated with user 2, with reference to a geographic location of client device 102, which is associated with user 1. In this example, because the relative geographic location of user 2 depends on the geographic locations of both users 1 and 2, client device 102 determines a geographic attribute of client device 102 and a geographic attribute of client device 104.

Referring back to FIG. 2, client device 102 may execute sound determination manager 124 to determine the relative geographic location of client device 104. For example, client device 102 may determine a geographic attribute of client device 104 by generating a local characterization of sound information for client device 104, based on sound information received from client device 104, using the techniques described herein.

Client device 102 may also determine a geographic attribute of client device 102 by (i) receiving an external characterization of sound information, for example, from client devices 104, 106, (ii) combining the local characterization of sound information with the external characterization of sound information to generate combined characterization of sound information, and (iii) applying determination rules to the combined characterization of sound information. Client device 102 may then generate information indicative of the relative geographic location of client device 104 by combining the geographic attribute of client device 104 with the geographic attribute of client device 102.

Figure 5:
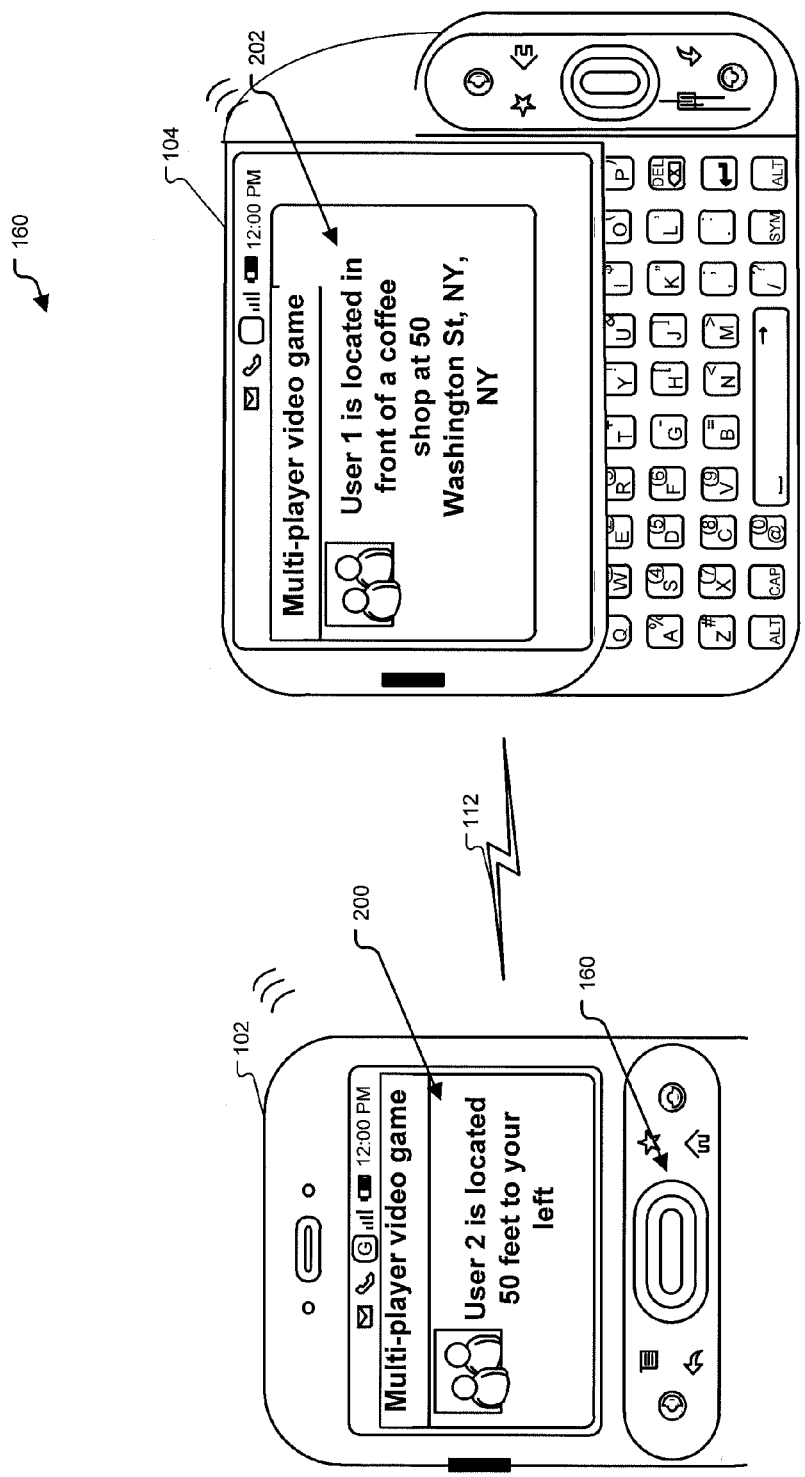
FIG. 5 is an example of graphical user interfaces generated by the system and displayed on client devices.

FIG. 5 is an example of graphical user interfaces ("GUIs") 200, 202 generated by system 100 and displayed on client devices 102, 104. Client device 102 generates GUI 200 that when rendered on a display of client device 102 renders a visual representation of information indicative of the relative geographic location of client device 104 in relation to client device 102.

Still referring to the above MMO example, user 2 of MMO2 sends a request to MMO2 for an "absolute" geographic location of user 1, in which a geographic location of user 1 is independent from a geographic location of user 2. To determine the absolute geographic location of user 1, a sound characterization manager (not shown) running on client device 104 may determine a geographic attribute of client device 102. For example, using the techniques described herein (e.g., TDOA techniques), the sound characterization manager running on client device 104 may determine a geographic attribute of client device 102 that includes the absolute geographic location of client device 102.

In this example, client device 104 may receive sound information from client device 102. Client device 104 may use its sound characterization manager to generate a local characterization of sound information for client device 102, for example, based on an application of characterization rules. The local characterization of sound information for client device 102 may include information indicative of the absolute geographic location of user 1 associated with client device 102. Client device 104 generates GUI 202 that when rendered on a display of client device 104 renders a visual representation of information indicative of the absolute geographic location of user 1 associated with client device 102.

Figure 6:
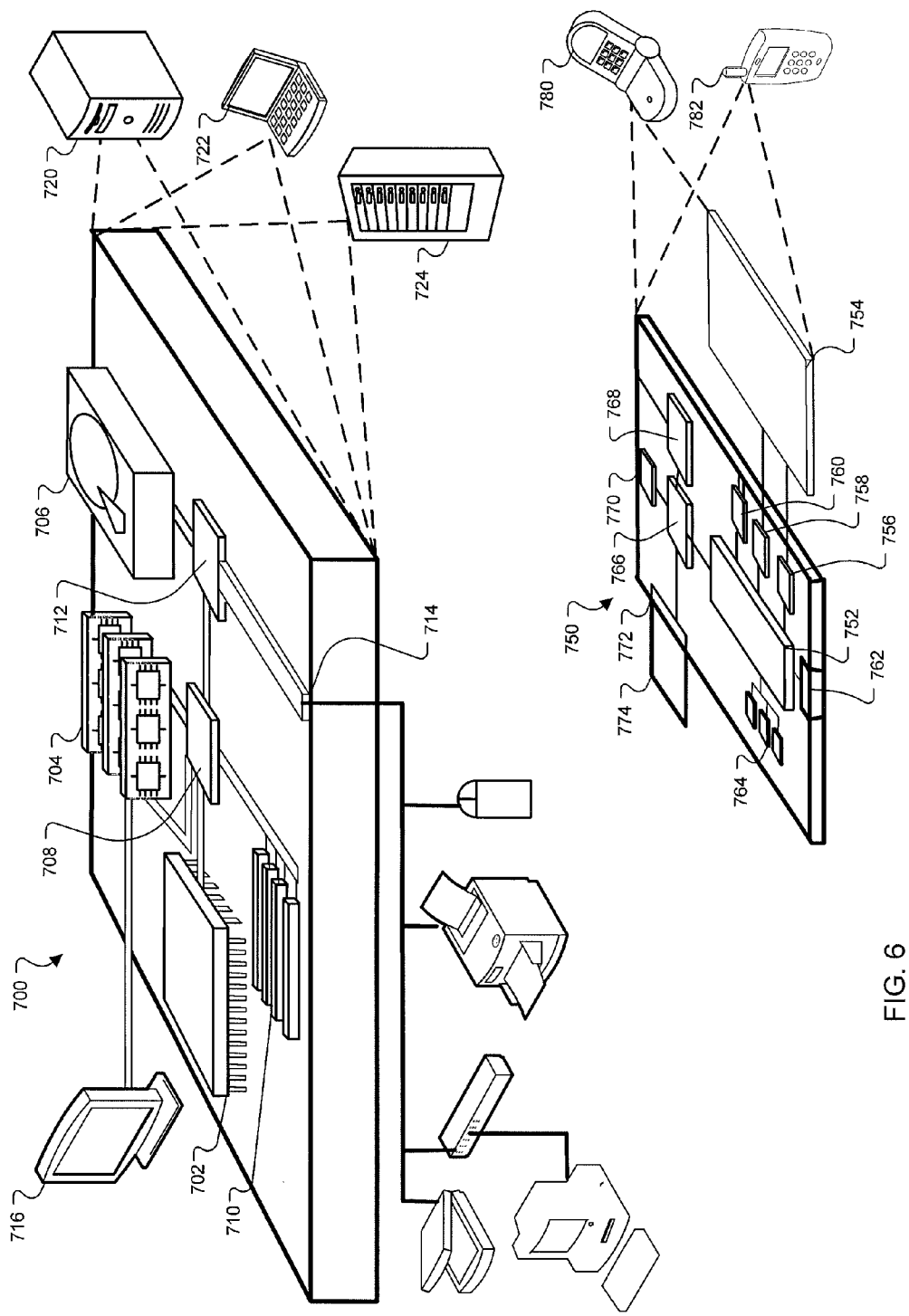
FIG. 6 shows an example of a computer device and a mobile computer device that can be used to implement the techniques described herein.

FIG. 6 shows an example of a computer device 700 and a mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, and so forth) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, the configuration of the system may be the same as in FIG. 2, except that server includes sound receipt manager 120, sound characterization manager 122, and sound determination manager 124.

In another implementation, server 108 receives sound information from client devices 102, 104, 106, characterizes the sound in real-time, and generates attribute of client devices 102, 104, 106 based on the characterized sound.

In still another implementation, a local characterization of sound information for client device 102 is generated locally by client device 102, for example by sound characterization manager 122. In this example, client device 102 uses sound information received from client devices 104, 106 to generate a characterization of sound information for client device 102 (e.g., a geographic attribute of client device 102).

In yet another implementation, sound characterization manager 122 includes sound determination manager 124 and/or sound characterization manager 122 and sound determination manager 124 are included in a same module.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Although a few implementations have been described in detail above, other modifications are possible. Moreover, other mechanisms for editing voice may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other embodiments not specifically described herein are also within the scope of the following claims.

What is claimed is:

1. A method performed by a first computing device, comprising:
receiving first sound information from one or more second computing devices within a communication range of the first computing device;
accessing one or more rules;
determining, based on application of at least one of the one or more rules to the first sound information, a characterization of the first sound information;
receiving information indicative of a characterization of second sound information transmitted from a third computing device, wherein the third computing device differs from the one or more second computing devices;
generating a combination of the characterization of the first sound information and the characterization of the second sound information;
transmitting, to a server computing device, the combination;
and
receiving, from the server computing device, an attribute of the first computing device.

2. The method of claim 1, further comprising:
sending, to the server computing device, the characterization of the first sound information.

3. The method of claim 1, wherein the attribute comprises one or more of (i) an absolute position of the first computing device, and (ii) a position of the first computing device relative to at least one of the one or more second computing devices.

4. The method of claim 1, wherein at least one of the one or more rules relate to a triangulation algorithm.

5. The method of claim 1, further comprising:
establishing a communication channel between the first computing device and the one or more second computing devices; and
receiving, through the communication channel, the first sound information.

6. The method of claim 1, further comprising:
sending, the one or more second computing devices, information indicative of the attribute.

7. One or more non-transitory machine-readable media configured to store instructions that are executable by one or more processing devices of a first computing device to perform operations comprising:
receiving first sound information from one or more second computing devices within a communication range of the first computing device;
accessing one or more rules;
determining, based on application of at least one of the one or more rules to the first sound information, a characterization of the first sound information;
receiving information indicative of a characterization of second sound information transmitted from a third computing device, wherein the third computing device differs from the one or more second computing devices;
generating a combination of the characterization of the first sound information and the characterization of the second sound information;
transmitting, to a server computing device, the combination;
and
receiving, from the server computing device, an attribute of the first computing device.

8. The one or more non-transitory machine-readable media of claim 7, wherein the operations further comprise:
sending, to the server computing device, the characterization of the first sound information.

9. The one or more non-transitory machine-readable media of claim 7, wherein the attribute comprises one or more of (i) an absolute position of the first computing device, and (ii) a position of the first computing device relative to at least one of the one or more second computing devices.

10. The one or more non-transitory machine-readable media of claim 7, wherein at least one of the one or more rules relate to a triangulation algorithm.

11. The one or more non-transitory machine-readable media of claim 7, wherein the operations further comprise:
establishing a communication channel between the first computing device and the one or more second computing devices; and
receiving, through the communication channel, the first sound information.

12. The one or more non-transitory machine-readable media of claim 7, wherein the operations further comprise:
sending, the one or more second computing devices, information indicative of the attribute.

13. An electronic system, comprising:
one or more processing devices; and
one or more non-transitory machine-readable media configured to store instructions that are executable by the one or more processing devices to perform operations comprising:
receiving first sound information from one or more first computing devices within a communication range of the electronic system;
acessing one or more rules;
determining, based on application of at least one of the one or more rules to the first sound information, a characterization of the first sound information;
receiving information indicative of a characterization of second sound information transmitted from a second computing device, wherein the second computing device differs from the one or more first computing devices;
generating a combination of the characterization of the first sound information and the characterization of the second sound information;
transmitting, to a server computing device, the combination;
and
receiving, from the server computing device, an attribute of the electronic system.

14. The electronic system of claim 13, wherein the operations further comprise:
sending, to the server computing device, the characterization of the first sound information.

15. The electronic system of claim 13, wherein the attribute comprises one or more of (i) an absolute position of the electronic system, and (ii) a position of the electronic system relative to at least one of the one or more first computing devices.

16. The electronic system of claim 13, wherein at least one of the one or more rules relate to a triangulation algorithm.

17. The electronic system of claim 13, wherein the operations further comprise:
establishing a communication channel between the electronic system and the one or more first computing devices; and
receiving, through the communication channel, the first sound information.

18. The electronic system of claim 13, wherein operations further comprise:

sending, to the one or more first computing devices, information indicative of the attribute.

19. An electronic system comprising:
one or more first computing devices configured to perform operations comprising:
receiving first sound information from one or more second computing devices within a communication range of the one or more first computing devices; and
accessing one or more rules; and
means for determining, based on application of at least one of the one or more rules to the first sound information, a characterization of the first sound information;
wherein the one or more first computing devices are further configured to perform operations comprising:
receiving information indicative of a characterization of second sound information transmitted from a third computing device, wherein the third computing device differs from the one or more second computing devices;
generating a combination of the characterization of the first sound information and the characterization of the second sound information;
transmitting, to a server computing device, the combination; and
receiving, from the server computing device, an attribute of at least one of the one or more first computing devices.

20. The electronic system of claim 19, wherein the attribute comprises one or more of (i) an absolute position of the at least one of the one or more first computing devices, and (ii) a position of the at least one of the one or more first computing devices relative to at least one of the one or more second computing devices.

21. The electronic system of claim 19, wherein at least one of the one or more rules relate to a triangulation algorithm.

22. The electronic system of claim 19, further comprising:
means for establishing a communication channel between at least one of the one or more first computing devices and the one or more second computing devices; and
means for receiving, through the communication channel, the first sound information.

\* \* \* \* \*

UNITED STATES PATENT AND TRADEMARK OFFICE
CERTIFICATE OF CORRECTION

PATENT NO.       : 8,179,742 B1                                       Page 1 of 1
APPLICATION NO.  : 13/248778
DATED            : May 15, 2012
INVENTOR(S)      : John Nicholas Jitkoff and Michael J. LeBeau It is certified that error appears in the above-identified patent and that said Letters Patent is hereby corrected as shown below:

Column 13, Line 41, In Claim 6, delete "sending, the" and insert --sending, to the--, therefor.

Column 14, Line 20, In Claim 12, delete "sending, the" and insert --sending, to the--, therefor.

Column 14, Line 31, In Claim 13, delete "acessing" and insert --accessing--, therefor.

Signed and Sealed this
Tenth Day of July, 2012

David J. Kappos
*Director of the United States Patent and Trademark Office*